P. GANZHORN.
MEAT CUTTING MACHINE.
APPLICATION FILED MAR. 27, 1913.
1,084,854.
Patented Jan. 20, 1914.
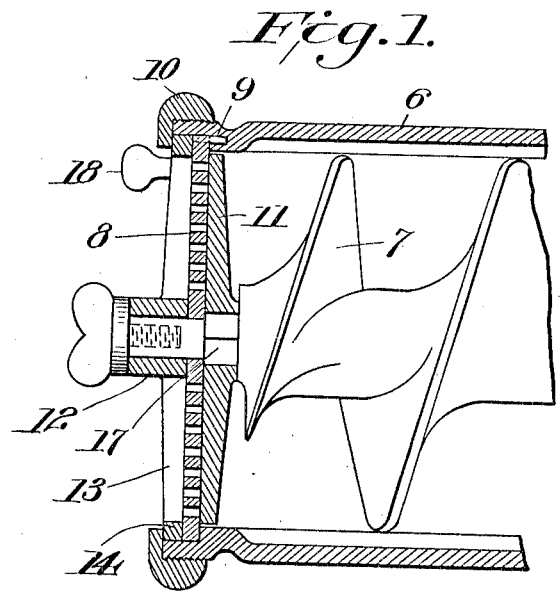
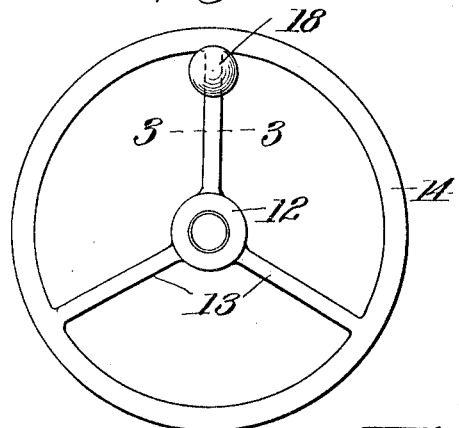
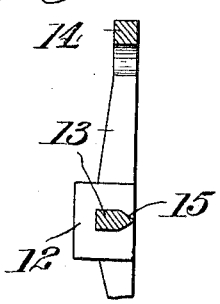
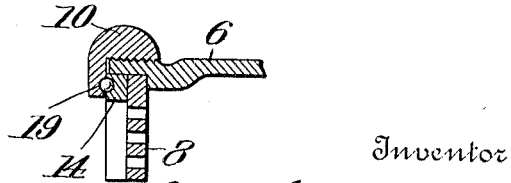
Witnesses
C. N. Walker
Edith Smith
Inventor
Philip Ganzhorn
By
Geo. E. Tew
Attorney

UNITED STATES PATENT OFFICE.

PHILIP GANZHORN, OF CHICAGO, ILLINOIS.

MEAT-CUTTING MACHINE.

1,084,854.  Specification of Letters Patent.  Patented Jan. 20, 1914.

Application filed March 27, 1913. Serial No. 757,227.

*To all whom it may concern:*

Be it known that I, PHILIP GANZHORN, a citizen of the United States, residing at Chicago, in the county of Cook and State of Illinois, have invented certain new and useful Improvements in Meat-Cutting Machines, of which the following is a specification.

This invention relates to meat cutting machines, and particularly to that type of machines in which a hollow cylindrical casing is used, with a screw within the casing which when it is turned forces the meat to a perforated plate at the outlet end of the machine, where the meat is cut or minced by means of a cutter rotating in contact with the plate.

It is desirable for various reasons to use a plate which can be readily renewed, since the plates become worn, and their cutting action is impaired. It is also desirable that these plates be made thin, on account of cost, and also, because they can be tempered better. The plates are subjected to considerable strain or pressure, but it is necessary that they be rigid in order to hold up in close contact with the edge of the revolving cutter. If a plate buckles, if only slightly, a clean shearing cut will not be produced, but the meat will be merely torn or crushed. My invention answers these desirable requirements and furthermore provides a plate which can be reversed and used on both sides, and so lasts twice as long as an ordinary plate. I provide a support behind the plate, consisting of a spider which prevents it from buckling or bending. If desired, this spider may also be turned for the purpose of scraping any remaining meat from the surface of the plate after it shall have been pressed through the same. It is a common fault of existing machines which are only occasionally used that meat remains on the surface of the plate, and is liable to contamination or decay.

My invention has the further advantage that the spider provides an adequate bearing for the spindle of the screw which extends through the plate and into the hub of the spider.

With these and other objects in view, an embodiment of the invention is herein described and is illustrated in the accompanying drawings in which—

Figure 1 is a sectional view of the rear end of the cylinder of a meat cutting machine containing the invention. Fig. 2 is a plan of the spider. Fig. 3 is a section of one of the arms of the spider on the line 3—3. Fig. 4 is a detail in section of a modification.

Referring specifically to the drawings, 6 indicates the barrel or cylinder of the machine, and 7 the screw therein. These may be of any suitable or ordinary type. The perforated plate 8 is located at the end of the barrel and is prevented from turning by a pin 9 set in a notch in the edge of the plate and projecting into the end of the barrel, which is also exteriorly threaded to receive the clamping ring 10 on the rear end thereof. The plate is comparatively thin and will be made of highly tempered steel having plain surfaces on both sides, and a large number of perforations, through which the meat is expressed after it is cut by rotating the cutter or knives 11 which are mounted on the spindle 17 of the screw. The edge of the plate sets against a shoulder in the end of the barrel or cylinder.

Against the outer side of the perforated plate I place a spider consisting of a hub 12, two or more arms 13 and an outer rim 14. The inner surface of the spider fits flatly against the perforated plate and serves to support the same and prevent any buckling or bending thereof, and both the spider and the plate are held in place by the clamping ring 10 which is screwed on the cylinder and bears against the rim 14 of the spider. The arms 13 of the spider are of sufficient depth to provide the rigidity necessary to support the pressure on the plate, and in order not to obstruct the passage of the meat through any of the perforations in the plate, the inner edges of the arms are beveled as indicated at 15, so that any meat passing through the holes under said arms can escape beside the same without such obstruction as would occur, for example, if the arms were of sufficient width to cover the holes. It will be understood that, as usual, the central part of the plate is not perforated, nor is the outer rim or margin thereof, the perforations being located in the intermediate portion. The spindle 17 extends through a hole in the plate and into a bearing at the center of the hub 12, whereby the screw is at all times held in its proper position.

On machines which are operated practically continuously, as in large establishments, the spider may remain clamped in its position as illustrated, since in such establishments the practice, at the end of the day's work, is to take the machine apart and clean it, but for domestic use with small machines or in establishments where the machine is only occasionally used, it is desirable, as stated above, to provide means for scraping the adhering meat from the outer side of the plate, and in order to do this, the spider may be provided with a handle or knob 18 by means of which the spider may be turned, and then the arms 13 will act as scrapers to clean the outer surface of the plate and remove any meat adhering thereto. Or the knob may be omitted and the spider turned by grasping the arms 13. Or other means may be provided to turn the spider. In Fig. 4 a modification is shown in which a ring of balls 19 is mounted in a raceway or groove in the flange of the ring 10, and the balls bearing between the ring and the rim of the spider will decrease the friction, and permit the spider to be more readily turned.

The number of the arms 13 of the spider may be varied according to circumstances; ordinarily three arms will be sufficient to fully support the plate. Likewise the form and proportions of the other parts may be varied within the scope of the invention.

What I claim as new is:

1. In a meat cutting machine or the like, the combination of a cylinder, a perforated plate at the outlet end thereof, through which the material is pressed, and a supporting spider bearing against the outer side of the plate, the spider having arms with beveled edges on the side next to the plate.

2. In a meat cutting machine or the like, the combination of a cylinder, a perforated plate at the outlet end thereof, a spider bearing against the outer face of the plate, and means mounted on the cylinder to hold the spider against the plate, the spider being rotatable while so held in contact with the plate by said means to scrape material from the outer face of the plate.

3. In a meat cutting machine or the like, the combination of a cylinder, a perforated plate at the outlet end thereof, a screw in the cylinder, provided with a spindle extending through the plate, and a rotary spider clamped to the cylinder, on the outer side of the plate, and having a bearing for the spindle.

In testimony whereof, I affix my signature in presence of two witnesses.

PHILIP GANZHORN.

Witnesses:
C. W. FOWLER,
GEO. E. TEW.

---

Copies of this patent may be obtained for five cents each, by addressing the "Commissioner of Patents Washington, D. C."